US012431117B2

(12) United States Patent
Bilal et al.

(10) Patent No.: US 12,431,117 B2
(45) Date of Patent: Sep. 30, 2025

(54) ELECTROENCEPHALOGRAPH SIGNAL GENERATION SPEECH IN A GENERATIVE ADVERSARIAL NETWORK

(71) Applicant: International Business Machines Corporation, Armonk, NY (US)

(72) Inventors: Erhan Bilal, Westport, CT (US); Chen Wang, Chappaqua, NY (US); Bo Wen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 18/341,867

(22) Filed: Jun. 27, 2023

(65) Prior Publication Data

US 2025/0006174 A1 Jan. 2, 2025

(51) Int. Cl.
*G10L 13/04* (2013.01)

(52) U.S. Cl.
CPC .................................... *G10L 13/04* (2013.01)

(58) Field of Classification Search
CPC ........................................................ G10L 13/04
USPC .......................................................... 704/258
See application file for complete search history.

(56) References Cited

U.S. PATENT DOCUMENTS 7,706,871 B2 * 4/2010 Devlin ................... A61B 5/369 600/300
10,058,290 B1 8/2018 Proud
10,799,186 B2 * 10/2020 Howard ................... A61B 5/11
11,260,078 B2 * 3/2022 Aliper ..................... A61K 35/36
2003/0013981 A1 * 1/2003 Gevins ................. A61B 5/4076 600/544
2016/0063205 A1 * 3/2016 Moturu .................. G16H 40/67 705/3
2016/0140320 A1 * 5/2016 Moturu .................... G09B 7/06 434/236
2019/0030078 A1 * 1/2019 Aliper .................. A61K 31/436
(Continued)

FOREIGN PATENT DOCUMENTS

CN 109199379 A 1/2019
KR 20170083351 A * 7/2017 .............. H04M 1/60
(Continued)

OTHER PUBLICATIONS

S. Biswas, P. Chand, A. Mathur and R. Sinha, "Characterization of the event-related potentials during GAN-based generation of EEG signals and their data augmented subject classification," 2023 International Conference on Recent Advances in Electrical, Electronics & Digital Healthcare Technologies (RE (Year: 2023).*
(Continued)

*Primary Examiner* — Bharatkumar S Shah
(74) *Attorney, Agent, or Firm* — Yee & Associates, P.C.

(57) ABSTRACT

A computer implemented method synthesizes electroencephalograph signals. A number of processor units creates a training dataset comprising real electroencephalograph signals, speech signals correlating to the real electroencephalograph signals, and a set of human characteristics for the real electroencephalograph signals. The number of processor units trains a generative adversarial network using the training dataset to create a trained generative adversarial network. The trained generative adversarial network generates synthetic electroencephalograph signals in response to receiving new speech signals.

20 Claims, 9 Drawing Sheets

(56) References Cited

U.S. PATENT DOCUMENTS

| | | | | |
|---|---|---|---|---|
| 2020/0037942 | A1* | 2/2020 | Howard | A61B 5/165 |
| 2023/0404466 | A1* | 12/2023 | Poltorak | A61B 5/374 |
| 2024/0005398 | A1* | 1/2024 | Sajda | G06Q 40/04 |
| 2024/0135172 | A1* | 4/2024 | Hyuga | G06T 7/0004 |

FOREIGN PATENT DOCUMENTS

| | | | | |
|---|---|---|---|---|
| KR | 102211030 | B1 * | 2/2021 | A61B 5/4806 |
| WO | WO-2020002519 | A1 * | 1/2020 | A61B 5/7221 |
| WO | WO-2023233979 | A1 * | 12/2023 | A61B 5/7267 |

OTHER PUBLICATIONS

Allee et al., "Limits of Nano-Gate Fabrication," Proceedings of the IEEE, vol. 79, No. 8, Aug. 1991, 13 pages. https://ieeexplore.ieee.org/document/92069.

Krishna et al., "Improving EEG based continuous speech recognition using GAN," May 29, 2020, arXiv:2006.01260, 5 pages. https://arxiv.org/abs/2006.01260.

Lin et al., "Using GANs for Sharing Networked Time Series Data: Challenges, Initial Promise, and Open Questions," ACM Internet Measurement Conference (IMC '20), Oct. 27-29, 2020, Virtual Event, 20 pages. https://arxiv.org/pdf/1909.13403.pdf.

Rasheed et al., "A Generative Model to Synthesize EEG Data for Epileptic Seizure Prediction," IEEE Transactions on Neural Systems and Rehabilitation Engineering, vol. 29, Nov. 10, 2021, 11 pages. https://pubmed.ncbi.nlm.nih.gov/34727036/, nih.gov.

Roy et al., "MIEEG-GAN: Generating Artificial Motor Imagery Electroencephalography Signals," Proceedings of International Joint Conference on Neural Networks, Mar. 20, 2020, 9 pages. https://ieeexplore.ieee.org/document/9206942.

Vahid et al., "Conditional generative adversarial networks applied to EEG data can inform about the interrelation of antagonistic behaviors on a neural level", Communication Biology, 2022, 11 pages.

* cited by examiner

ELECTROENCEPHALOGRAPH SIGNAL GENERATION SPEECH IN A GENERATIVE ADVERSARIAL NETWORK

BACKGROUND

The disclosure relates generally to an improved computer system and more specifically to generating electroencephalograph (EEG) signals using speech in a generative adversarial network (GAN).

In the area of neuroscience, machine learning models have been used to convert electroencephalograph signals into speech. This ability to generate speech from electroencephalograph signals can provide a tool for individuals who have lost the ability to speak due to various conditions. By detecting and interpreting brain activity associated with speech production, electroencephalograph signals can be used to generate synthesized speech. Further, this type of translation can also be used for interfaces to computers. Electroencephalograph signals associated with speech can be used to generate commands or other input for computers and other computing devices. Further, converting electroencephalograph signals into speech can be used in research, speech therapy, and rehabilitation.

SUMMARY

According to one illustrative embodiment, a computer implemented method synthesizes electroencephalograph signals. A number of processor units creates a training dataset comprising real electroencephalograph signals, speech signals correlating to the real electroencephalograph signals, and a set of human characteristics for the real electroencephalograph signals. The number of processor units trains a generative adversarial network using the training dataset to create a trained generative adversarial network. The trained generative adversarial network generates synthetic electroencephalograph signals in response to receiving new speech signals. According to other illustrative embodiments, a computer system and a computer program product for synthesizing electroencephalograph signals are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
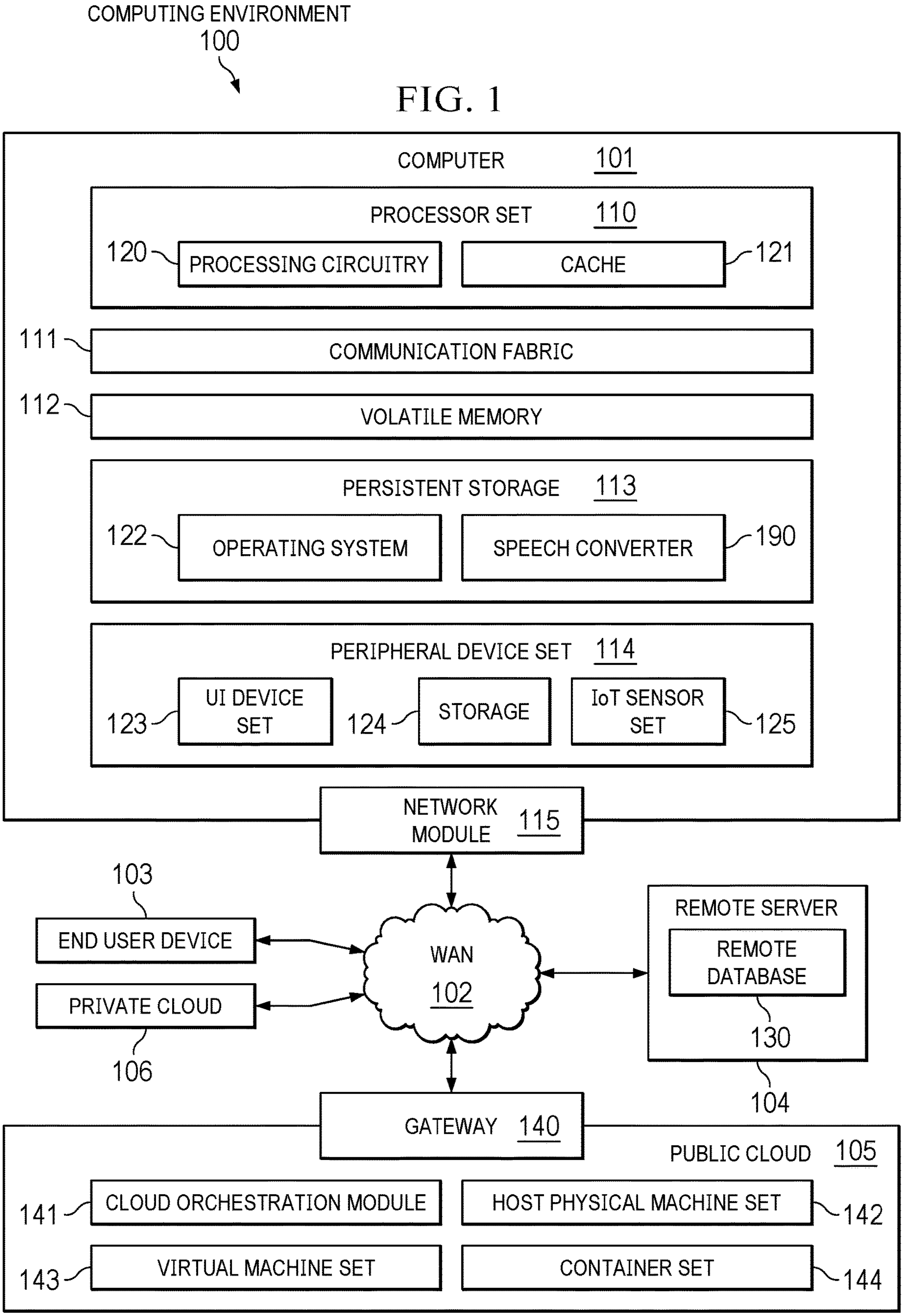
FIG. 1 is a block diagram of a computing environment in which illustrative embodiments can be implemented.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as speech converter 190. In addition to speech converter 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and speech converter 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in speech converter 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in speech converter 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of considerations as described herein. An ability to generate electroencephalograph (EEG) signals from speech can be used in studying various human characteristics. For example, by simulating speech-specific brain waves, researchers can investigate the neural mechanisms underlying various mental disorders and identify electroencephalograph signatures of these disorders. These electroencephalograph signals can be associated with different mental conditions and can be useful in diagnosing those mental conditions. By simulating speech specific brain waves in the form of electroencephalograph signals, researchers can investigate the neural mechanisms underlying various mental conditions and identify electroencephalograph signal signatures of these conditions.

Thus, one or more illustrative embodiments enable generating electroencephalograph signals from speech. In the illustrative examples, a time series generative adversarial network (GAN) is used to generate electroencephalograph signals from speech. The illustrative embodiments provide a computer implemented method, computer system, and computer program product for synthesizing electroencephalograph signals.

In one illustrative example, a computer implemented method synthesizes electroencephalograph signals. A number of processor units creates a training dataset comprising real electroencephalograph signals, speech signals correlating to the real electroencephalograph signals, and a set of human characteristics for the real electroencephalograph signals. The number of processor units trains a generative adversarial network using the training dataset to create a trained generative adversarial network. The trained generative adversarial network generates synthetic electroencephalograph signals in response to receiving new speech signals.

In one example, the trained generative adversarial network can generate synthetic electroencephalograph signals in response to receiving speech signals. Further in this example, the trained generative adversarial network also outputs a number of the set of human characteristics related to the speech signals.

In another example, the trained generative adversarial network can generate synthetic electroencephalograph signals in response to receiving speech signals and a number of the set of human characteristics. The synthetic electroencephalograph signals correspond to real electroencephalograph signals that would be recorded for a person generating the same speech signals and having the number of the set of human characteristics. As result, the human characteristics selected can be varied and the synthetic electroencephalograph signals generated represent the real electroencephalograph signals that would be recorded for person with those human characteristics generating the speech signals.

Figure 2:
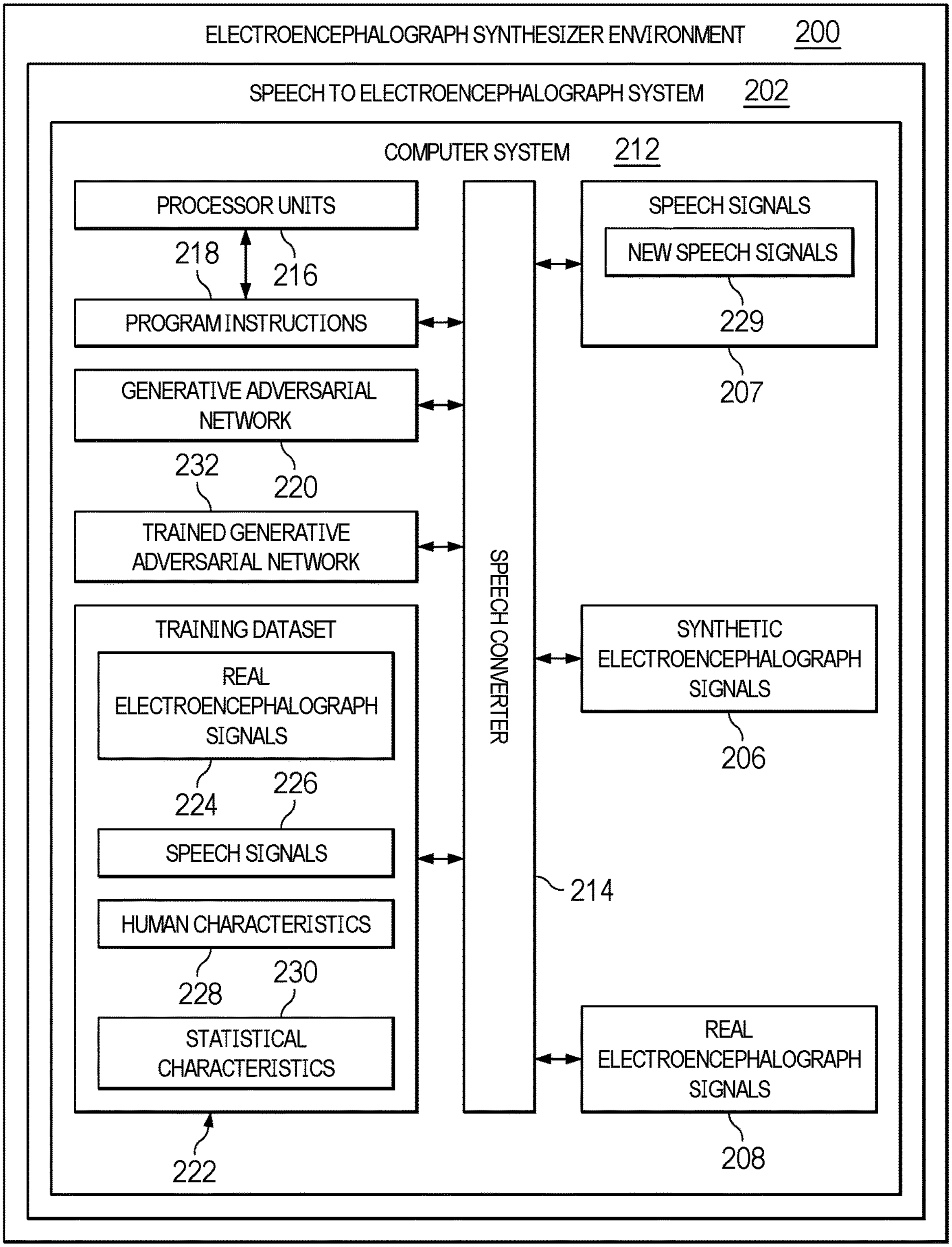
FIG. 2 is a block diagram of a speech converter environment in accordance with an illustrative embodiment.

With reference now to FIG. 2, a block diagram of a speech converter environment is depicted in accordance with an illustrative embodiment. In this illustrative example, electroencephalograph synthesizer environment 200 includes components that can be implemented in hardware such as the hardware shown in computing environment 100 in FIG. 1. In this example, speech to electroencephalograph system 202 can create synthetic electroencephalograph signals 206 from speech signals 207. Synthetic electroencephalograph signals 206 can be in analog or digital form. Speech signals 207 is a recording of speech that is to be transformed into synthetic electroencephalograph signals 206 that correspond as closely as possible to real electroencephalograph signals 208. For example, real electroencephalograph signals 208 can be recorded as speech signals 207 is recorded. In the illustrative examples, speech to electroencephalograph system 202 can create synthetic electroencephalograph signals 206 that correspond as closely as possible to real electroencephalograph signals 208 from using speech signals 207 as an input.

In this illustrative example, speech to electroencephalograph system 202 comprises computer system 212 and speech converter 214. Speech converter 214 is located in computer system 212. Speech converter 214 can be implemented using speech converter 190 in FIG. 1.

Speech converter 214 can be implemented in software, hardware, firmware or a combination thereof. When software is used, the operations performed by speech converter 214 can be implemented in program instructions configured to run on hardware, such as a processor unit. When firmware is used, the operations performed by speech converter 214 can be implemented in program instructions and data and stored in persistent memory to run on a processor unit. When hardware is employed, the hardware can include circuits that operate to perform the operations in speech converter 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, speech converter 214 can synthesize synthetic electroencephalograph signals 206 using generative adversarial network 220. In this example, generative adversarial network 220 is trained by speech converter 214 to generate synthetic electroencephalograph signals 206 in response to receiving speech signals 207.

Speech converter 214 creates training dataset 222 comprising real electroencephalograph signals 224, speech signals 226 correlating to real electroencephalograph signals 224, and a set of human characteristics 228 for real electroencephalograph signals 224. In this example, training dataset 222 can also comprise a set of statistical characteristics 230 determined from real electroencephalograph signals 224.

As used herein, a "set of" when used with reference items means one or more items. For example, a set of human characteristics is one or more human characteristics.

In this illustrative example, the set of human characteristics 228 is selected from at least one of an age, a gender, an ethnicity, an income level, an education level, an occupation, a marital status, a geographic location, a height, a hair color, an eye color, a body mass index, a cardiovascular attribute, health attribute, a mental health attribute, a mental disorder attribute, a neurodegenerative condition, a speech disorder, a skull property, a brain anatomy attribute, or other suitable human characteristic of interest. Further in this example, the set of statistical characteristics 230 is selected from at least one of a mean, a variance, a skewness, a non-excess or historical kurtosis, a hyperskewness, a hypertailedness, a high-order or mixed moments, a cumulant, a frequency distribution of real electroencephalograph signals 224, or other suitable statistical characteristics of interest.

In this example, speech converter 214 trains generative adversarial network 220 using training dataset 222 to create trained generative adversarial network 232. Trained generative adversarial network 232 generates synthetic electroencephalograph signals 206 in response to receiving new speech signals 229. Trained generative adversarial network 232 can also output a number of the set of human characteristics 228 associated with new speech signals 229. In this example, new speech signals 229 are speech signals for which generation of synthetic electroencephalograph signals 206 is desired rather than speech signals 207 used for training.

In another example, speech converter 214 inputs new speech signals 229 and a number of the set of human characteristics 228 into trained generative adversarial network 232. Speech converter 214 receives synthetic electroencephalograph signals 206 from trained generative adversarial network 232. In this example, these synthetic electroencephalograph signals are the types of electroencephalograph signals that would be generated for the number of the set of human characteristics 228 that have been selected as being of interest.

In this example, the number of the set of human characteristics 228 can be one or more of the set of human characteristics in training dataset 222. This type of training enables generating synthetic electroencephalograph signals 206 that result from speech signals 207 being received from a person having the number of the set of human characteristics 228. In other words, trained generative adversarial network 232 can generate synthetic electroencephalograph signals 206 that correspond to or match real electroencephalograph signals 208 for a person having the number of the set of human characteristics 228.

In one illustrative example, one or more technical solutions are present that overcome a problem with generating synthetic electroencephalograph signals from speech signals that are as close as possible to real electroencephalograph signals occurring from the same speech signals. In other words, the electroencephalograph signals are the same or as close as possible to pass as being real electroencephalograph signals recorded for the speech signals for a number of human characteristics. In other words, a number of human characteristics and speech signals results in the generation of synthetic electroencephalograph signals that are the same as real electroencephalograph signals occurring from speech generated by a person with the number of human characteristics selected from the set of human characteristics.

In these examples, one or more solutions provide an ability to generate synthetic electroencephalograph signals based on speech signals and a number of human characteristics of a set of human characteristics input into a generative adversarial network that can pass for real electroencephalograph signals detected for a person with the number of human characteristics with same speech signals generated by the person speaking. As a result, electroencephalograph signals can be generated for research purposes and for diagnosing conditions from using speech signals.

Computer system 212 can be configured to perform at least one of the steps, operations, or actions described in the different illustrative examples using software, hardware, firmware or a combination thereof. As a result, computer system 212 operates as a special purpose computer system in which speech converter 214 in computer system 212 enables creating a generative adversarial network that is capable of generating electroencephalograph signals for particular human characteristics using speech as an input. In particular, speech converter 214 transforms computer system 212 into a special purpose computer system as compared to currently available general computer systems that do not have speech converter 214.

In the illustrative example, the use of speech converter 214 in computer system 212 integrates processes into a practical application for synthesizing electroencephalograph signals with increased performance compared to current systems. In other words, speech converter 214 in computer system 212 is directed to a practical application of processes integrated into speech converter 214 in computer system 212 that train a generative adversarial network to output synthetic electroencephalograph signals in response to receiving speech signals and a number of human characteristics as input. The synthetic electroencephalograph signals sufficiently match real electroencephalograph signals to pass as real electroencephalograph signals recorded from a person generating the same speech signals and having the number of human characteristics.

In these examples, a generative adversarial network (GAN) comprises two neural network systems that compete with each other in a zero-sum game framework. One neural network system is a generator that is trained to mimic the distribution of the training dataset in question. The generator receives an input and produces a "fake" output that is intended to mimic the training dataset. This fake output can also be referred to as a synthetic output.

The other neural network system is a discriminator. The purpose of the discriminator is to learn to determine if the output from the generator is real or fake. The mimicked output is compared with the training dataset. The generator's training objective is to increase the error rate of the discriminator (i.e., fool the discriminator). Backpropagation can be applied to both neural network systems so that the generator produces better mimicked outputs, while the discriminator becomes more skilled at detecting mimicked outputs.

If the discriminator cannot tell that the output is fake (mimicked) the generator passes the test, and the generator can be used to reproduce the functionality represented by the training dataset.

Figure 3:
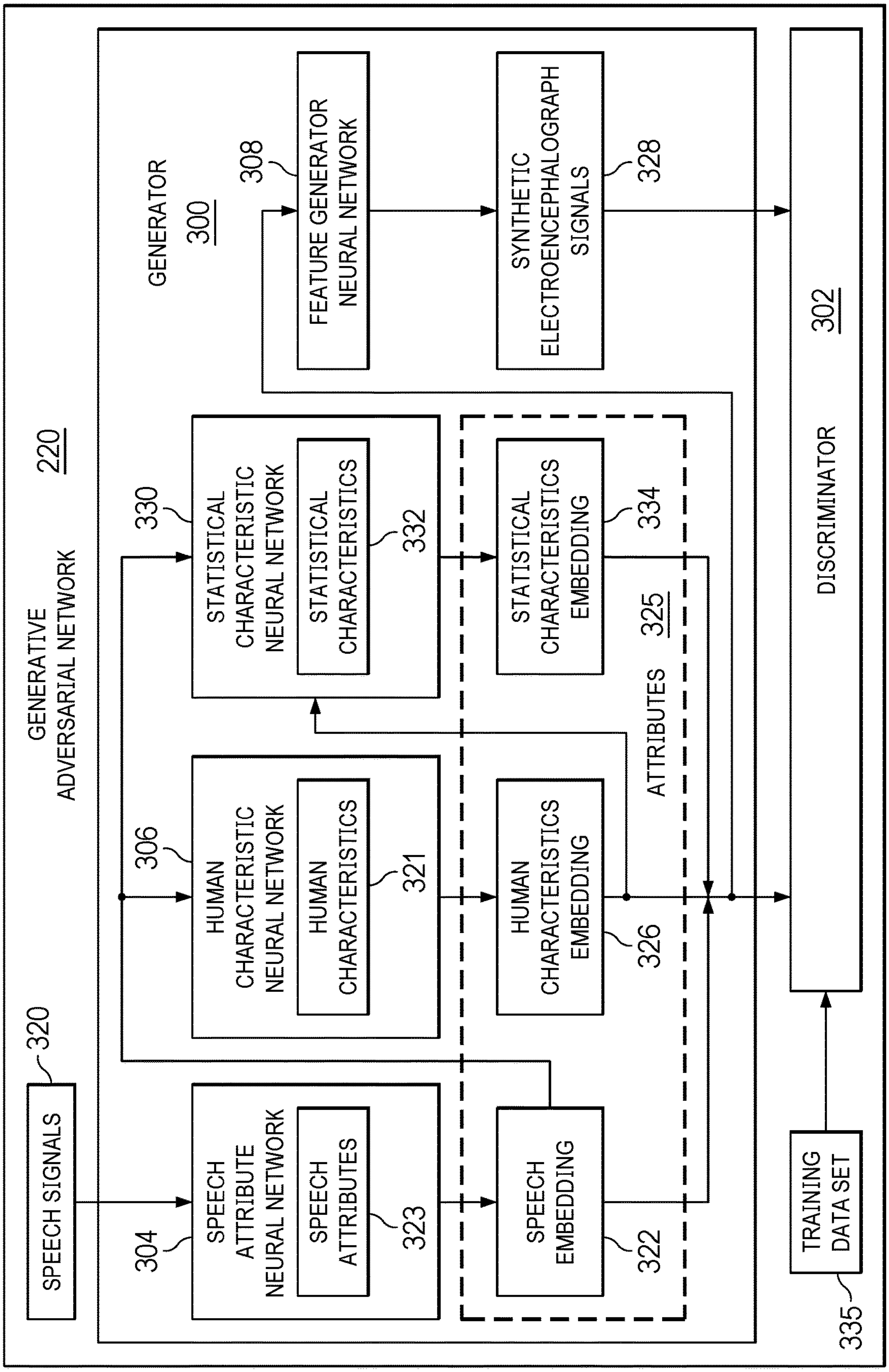
FIG. 3 is a block diagram of a generative adversarial network in accordance with an illustrative embodiment.

With reference next to FIG. 3, a block diagram of a generative adversarial network is depicted in accordance with an illustrative embodiment. In this example, an illustration of components that can be used to implement generative adversarial network 220 in are shown in this figure. In this example, during training, generative adversarial network 220 can include generator 300 and discriminator 302. In this example, each of these components can be comprised of one or more neural networks.

Discriminator 302 is used during training of generative adversarial network 220. After generative adversarial network 220 is trained to form trained generative adversarial network 232, discriminator 302 is not needed in actual use to synthesize synthetic electroencephalograph signals 206.

In this illustrative example, discriminator 302 is trained using training data set 335. Training data set 335 can be, for example, training dataset 222 in FIG. 2. Discriminator 302 can be trained to determine whether different outputs generated by generator 300 are real or fake. These outputs include, for example, speech embedding 322, human characteristics embedding 326, statistical characteristics embedding 334, and synthetic electroencephalograph signals 328. This example, speech embedding 322, human characteristics embedding 326, and statistical characteristics embedding 334 are attributes 325 in an embedded form. These embeddings are a format expected or used by the neural networks being trained in generator 300 and in discriminator 302.

In this example, discriminator 302 can determine whether attributes 325 and whether synthetic electroencephalograph signals 328 are real or fake. This determination is used to train the different neural networks in generator 300.

These determinations form feedback that can be used to update the neural networks in generator 300 using backpropagation. In these examples, backpropagation is also referred to as backward propagation of errors and is an algorithm used to train neural networks. This algorithm can adjust weights and biases of the neural networks based on errors observed during training of the neural networks.

In this illustrative example, generator 300 includes number of different components. As depicted, generator 300 comprises speech attribute neural network 304, human characteristic neural network 306, and feature generator neural network 308. In some illustrative examples, generator 300 can also include an optional component such as statistical characteristic neural network 330.

In this illustrative example, speech attribute neural network 304, human characteristic neural network 306, and statistical characteristic neural network 330 can be implemented using multi-layer perceptrons (MLPs) or transformers. Feature generator neural network 308 can be implemented using a network of recurrent neural networks (RNNs) and multi-layer perceptrons (MLPs). In other illustrative examples, other types of neural networks can be used such as a transformer, a convolutional neural network (CNN), or other suitable types of neural networks.

In this example, a recurrent neural network is a type of deep neural network in which the nodes are formed along a temporal sequence. Recurrent neural networks exhibit temporal dynamic behavior, meaning they model behavior that varies over time. RNNs are recurrent because they perform the same task for every element of a sequence, with the output being dependent on the previous computations. Recurrent neural networks can be thought of as multiple copies of the same network, in which each copy passes a message to a successor. Whereas traditional neural networks process inputs independently, starting from scratch with each new input, recurrent neural networks persist information from a previous input that informs processing of the next input in a sequence. Because of persistence in the recurrent neural network, at time step t, the state of the hidden layer is calculated based on the previous hidden state at time t−1 and the new input vector. The hidden state acts as the "memory" of the network. Therefore, the output at time step t depends on the calculation at time step t−1. Similarly, output at time step t+1 depends on the calculation at time step t.

There are several variants of recurrent neural networks such as "vanilla" recurrent neural networks, Long Short-Term Memory (LSTM), Gated Recurrent Unit (GRU), and others that can be used in illustrative examples.

As depicted, speech attribute neural network 304 receives speech signals 320 and determines speech attributes 323 from speech signals 320. Speech attribute neural network 304 outputs speech embedding 322. Speech embedding 322 contains speech attributes 323 in an embedded form.

These speech attributes may be present for particular human characteristics. Speech attributes can include, for example, patterns speech. For example, the use of more pronouns but fewer adverbs and adjectives can be an attribute. As another example, repetitiveness, verbosity, vocabulary, total number of words, unique words, information content, word frequency, and other attributes that can be identified from speech signals 320. These attributes are embedded to form speech embedding 322.

In this example, speech attribute neural network 304 has been previously trained to generate speech embedding 322 from speech signals 320. In these examples, speech signals 320 are used as a context for training generator 300 increase the accuracy with which attributes 325 such as human characteristics embedding 326 and statistical characteristics embedding 334 are generated. Additionally, speech signals 320 are used as a context for feature generator neural network 308 to create synthetic electroencephalograph signals 328. In these examples, the speech signals are embedded to form speech embedding 322 in the form for use by these neural networks.

Human characteristic neural network 306 receives speech embedding 322 and determines a set of human characteristics embedding 326 using speech signals 320 embedded in speech embedding 322. The set of human characteristics embedding 326 can be selected from least one of an age, a gender, an ethnicity, an income level, an education level, an occupation, a marital status, a geographic location, a height, a hair color, an eye color, a body mass index, a cardiovascular attribute, health attribute, a mental health attribute, a mental disorder attribute, a neurodegenerative condition, a speech disorder, a skull property, a brain anatomy attribute, or other suitable human characteristic of interest. Human characteristic neural network 306 embeds the set of human characteristics embedding 326 and outputs human characteristics embedding 326.

When statistical characteristic neural network 330 is used in generator 300, statistical characteristic neural network 330 receives speech embedding 322 from speech attribute neural network 304 and human characteristics embedding

326 from human characteristic neural network 306. In this example, statistical characteristic neural network 330 determines statistical characteristics 332 based on human characteristics 321 in human characteristics embedding 326 and speech embedding 322. Statistical characteristics 332 are output as statistical characteristics embedding 334.

Feature generator neural network 308 receives speech embedding 322, human characteristics embedding 326, and statistical characteristics embedding 334. In this example, feature generator neural network 308 outputs synthetic electroencephalograph signals 328 using speech embedding 322, human characteristics embedding 326, and statistical characteristics embedding 334.

In this example, discriminator 302 receives speech embedding 322, human characteristics embedding 326, statistical characteristics embedding 334, and synthetic electroencephalograph signals 328 and makes a determination as to whether human characteristics embedding 326, statistical characteristics embedding 334, and synthetic electroencephalograph signals 328 are real or fake.

This determination is used as feedback to human characteristic neural network 306 in feature generator neural network 308. These neural networks can be updated with the result of the determinations made by discriminator 302 using backpropagation. The goal is to train feature generator neural network 308 to generate synthetic electroencephalograph signals 328 with such accuracy to real electroencephalograph signals that discriminator 302 cannot tell whether synthetic electroencephalograph signals 328 are real or fake. In this illustrative example, discriminator 302 can be implemented using a neural network and can be trained ahead of time to distinguish between real and fake (synthetic) electroencephalograph signals.

When statistical characteristics embedding 334 is generated, discriminator 302 also determines whether statistical characteristics embedding 334 is real or fake. This result is used to update statistical characteristic neural network 330 using backpropagation.

For example, statistical characteristic neural network 330 can determine a mean and variance for electroencephalograph signals for a human characteristic such as a particular mental disorder and output the mean and variance as statistical characteristics embedding 334. This human characteristic is received as an embedding in human characteristics embedding 326.

With the use of statistical characteristic neural network 330, feature generator neural network 308 also receives statistical characteristics embedding 334 and outputs the synthetic electroencephalograph signals using speech embedding 322, human characteristics embedding 326, and statistical characteristics embedding 334. Statistical characteristics embedding 334 can help increase the accuracy of synthetic electroencephalograph signals 328 generated by feature generator neural network 308.

When training is complete, discriminator 302 is no longer used. This component can be removed from generative adversarial network 220 to form trained generative adversarial network 232. Further, as a trained generative adversarial network, the inputs to generative adversarial network 220 change. Generative adversarial network 220 still receives speech signals 320 and a selection of one or more human characteristics 321 of interest.

With the input of speech signals 320 and a selection of human characteristics 321, generative adversarial network 220 outputs synthetic electroencephalograph signals 328 for desired human characteristics for a particular sample of speech signals 320. In other words, different human characteristics in human characteristics embedding 326 can be selected for the same speech signals and generative adversarial network 220 outputs synthetic electroencephalograph signals 328 that corresponds to the real electroencephalograph signals that would be recorded for the same speech signals for a person with the selected human characteristic.

For example, the human characteristic can be a particular mental disorder. With the selection of the particular mental disorder as the human characteristic and the speech signals, the synthetic electroencephalograph signals generated correspond to the real electroencephalograph signals that would be recorded for a person generating the speech signals having the particular mental disorder attribute.

As another example, with the selection of an age as a human characteristic and the speech signals, the synthetic electroencephalograph signals generated correspond to the real electroencephalograph signals that would be recorded for a person generating the speech signals having the selected age. In this example, the same speech signals can be used for different human characteristics resulting in different synthetic electroencephalograph signals being output by the trained generative adversarial network that correspond to the real electroencephalograph signals that would be recorded for a person generating the speech signals having the particular mental disorder attribute.

The illustration of electroencephalograph synthesizer environment 200 and the different components in FIGS. 2-3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more trained generative adversarial networks can be created based on a different set of human characteristics from the set of human characteristics 228. Further, in some illustrative examples, statistical characteristics 230 is optional and can be excluded from training dataset 222.

Figure 4:
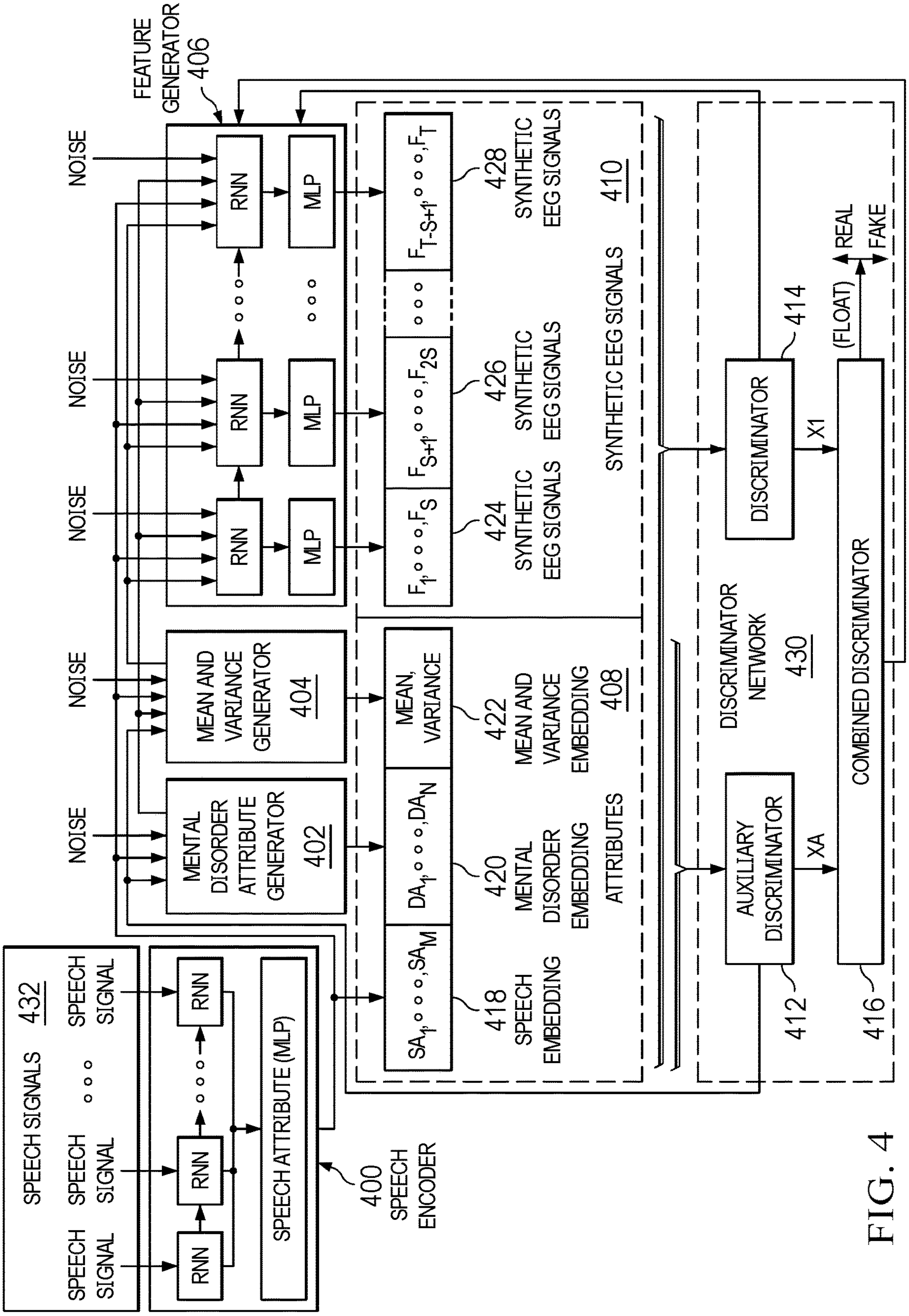
FIG. 4 is dataflow diagram for training a generative adversarial network to generate synthetic electroencephalograph (EEG) signals in accordance with an illustrative embodiment.

With reference next to FIG. 4, a dataflow diagram for training a generative adversarial network to generate synthetic electroencephalograph (EEG) signals is depicted in accordance with an illustrative embodiment. In this illustrative example, FIG. 4 illustrates training of generative adversarial network 220 in FIG. 2 and FIG. 3.

Feature generator 406 is trained using attributes 408 to generate synthetic electroencephalograph (EEG) signals 410. In this illustrative example, noise is introduced to the components in the generative adversarial network to initiate the training process. Noise is used in the early stages for training the generative adversarial network and can improve the performance of generators in the generative adversarial network during the training. In other words, value for noise can vary based on the architecture for the generative adversarial network and the desired characteristics of outputs from the generative adversarial network. For example, noise can be random values for training the generative adversarial network until a value for noise can produce data that cannot be distinguished from the real data by discriminators in the generative adversarial network during training. Feature generator 406 can be an example of feature generator neural network 308 in FIG. 3 and synthetic electroencephalograph (EEG) signals 410 can be an example of synthetic electroencephalograph signals 328 in FIG. 3.

In this illustrative example, attributes 408 includes speech embedding 418 generated by speech encoder 400, mental disorder embedding 420 generated by mental disorder attribute generator 402, and mean and variance embedding 422 generated by mean and variance generator 404. In this example, these embeddings are numerical representations of attributes from input data that can be used as input into different neural networks in the generative adversarial network. These numerical representations can be in the form of vectors. In this illustrative example, attributes 408 can be example of attributes 325 in FIG. 3.

Speech encoder 400 includes a neural network that can be used to process time series data. As used herein, a reference to a neural network can mean that one or more neural networks are used to implement the neural network. Other components used with neural networks may also be present.

In this example, speech encoder 400 can include recurrent neural networks (RNNs) that sequentially analyze speech signals 432. Recurrent neural networks (RNNs) have internal memory that allows the recurrent neural networks (RNNs) to store information related to a portion of time series data and incorporates the stored information when analyzing other portion of the time series data. In other words, recurrent neural networks (RNNs) process time series data in a sequential manner and use information gathered from previous time steps to analyze a current time step in the time series data.

In this example, recurrent neural networks (RNNs) in speech encoder 400 receive speech signals 432 and generate embeddings for the speech signals 432. Speech encoder 400 also includes multi-layer perceptrons (MLPs) that takes output from recurrent neural networks (RNNs) in speech encoder 400. The multi-layer perceptrons (MLPs) use embeddings for the speech signals 432 to generate speech embedding 418 in a form that can be used by other components of the generative adversarial network. Multi-layer perceptrons (MLPs) improve the quality of embeddings for the speech signals 432 received from recurrent neural networks (RNNs). In this example, speech encoder 400 can be an example of speech attribute neural network 304 in FIG. 3 and speech embedding 418 can be an example of speech embedding 322 in FIG. 3.

Mental disorder attribute generator 402 receives speech embedding 418 to generate mental disorder embedding 420 that can be understood by other components in the generative adversarial network. In this example, mental disorder attribute generator 402 uses multi-layer perceptrons (MLPs) to identify attributes for a mental disorder from speech embedding 418 and outputs identified attributes as mental disorder embedding 420.

For example, attributes associated with mental disorder from speech embedding 418 can be demographic information, information associated with mental disorders, information associated with diagnosis of mental disorders or information associated with results and scoring for mental disorder tests. In this example, mental disorder attribute generator 402 can be an example of human characteristic neural network 306 in FIG. 3 and mental disorder embedding 420 can be an example of human characteristics embedding 326 in FIG. 3.

In this depicted example, mean and variance generator 404 receives speech embedding 418, noise, and mental disorder embedding 420 and uses these inputs to generate mean and variance embedding 422 that can be understood by other components in the generative adversarial network. Mean and variance generator 404 uses multi-layer perceptrons (MLPs) that identify mean and variance from speech embedding 418 that are associated with attributes in mental disorder embedding 420.

In this illustrative example, the mean is the average of the electroencephalograph signals, and the variation is the range that the electroencephalograph signals can have. In other words, the variation indicates the maximum and minimum values for the electroencephalograph signals.

In this illustrative example, different mental disorders can have different statistics for electroencephalograph signals. For example, the mean and variation in the range of electroencephalograph signals for Alzheimer's disease can be different from mean and the variation in the range of electroencephalograph signals for schizophrenia. In this example, mean and variance generator 404 is trained to determine mean and variation statistics associated with electroencephalograph signals from speech signals 432 for different mental disorders.

As depicted, mean and variance generator 404 outputs a mean and variance as mean and variance embedding 422. Mean and variance generator 404 is an example of an implementation for statistical characteristic neural network 330 in FIG. 3 and mean and variance embedding 422 is an example of statistical characteristics embedding 334 in FIG. 3.

In this illustrative example, feature generator 406 receives speech embedding 418, mental disorder embedding 420, and mean and variance embedding 422 to generate synthetic electroencephalograph signals 410. Feature generator 406 includes recurrent neural networks (RNNs) that use speech embedding 418, mental disorder embedding 420, and mean and variance embedding 422 as input. In this example, generation of synthetic electroencephalograph signals 410 are performed in time intervals. Synthetic electroencephalograph signals 410 are time series data.

As depicted, the outputs from recurrent neural networks (RNNs) for each time interval are used as an inputs to multi-layer perceptrons (MLPs) that generate synthetic electroencephalograph signals for each time interval in synthetic electroencephalograph (EEG) signals 410. For example, synthetic electroencephalograph signals 424 are generated from time step 1 to time step S, synthetic electroencephalograph signals 426 are generated from time step S+1 to time step 2S, and synthetic electroencephalograph signals 428 are generated from time step T−S+1 to time step T.

In this illustrative example, discriminator network 430 can be implemented using neural networks in training. Discriminator network 430 uses training data to determine the quality of synthetic electroencephalograph signals 410 and attributes 408. Discriminator network 430 determines the quality of synthetic data by performing classification to distinguish real data from synthetic data. In other words, discriminator network 430 is trained to differentiate between real data and synthetic data such that feedback can be provided to improve the generative adversarial network to generate more realistic data. On the other hand, generators in the generative adversarial network operate to generate synthetic data with a level of accuracy for cause discriminator network 430 to classify the synthetic data as real instead of fake. As a result, generators in the generative adversarial network compete with discriminators in discriminator network 430 during training to generate synthetic data to be as realistic as possible.

In this example, each discriminator in discriminator network 430 has a loss function that provides an averaged result for all classifications performed by the discriminator in discriminator network 430. In other words, loss functions for discriminators in discriminator network 430 provide indications of how well the discriminators perform in classifying real data and synthetic data.

For example, each classification performed by a discriminator in discriminator network 430 can be evaluated to generate a binary output. For example, an incorrect classification for the discriminator produces an output of 1 and a correct classification for the discriminator produces an output of 0. As a result, loss function for the discriminator can generate a summed average as an output indicating an error rate for the discriminator.

In this example, a threshold for the error rate can be defined to determine whether the performance of the discriminator is poor. The discriminator performs poorly if output from the loss function indicates an error rate that exceeds the threshold for the error rate. On the other hand, the discriminator performs well if output from the loss function indicates an error rate that does not exceed the threshold for the error rate.

Discriminator network 430 comprises auxiliary discriminator 412, discriminator 414, and combined discriminator 416. In this example, discriminator network 430, auxiliary discriminator 412, discriminator 414, and combined discriminator 416 can be examples of components that can be used to form discriminator 302 in FIG. 3.

In this illustrative example, auxiliary discriminator 412 determines the quality of mental disorder embedding 420 and mean and variance embedding 422 in attributes 408 using speech embedding 418. The quality of an embedding in attributes 408 refers to how realistic the embedding is. In other words, an embedding in attributes 408 has a good quality if embedding in attributes 408 cannot be distinguished from real data by a discriminator in discriminator network 430.

In this illustrative example, auxiliary discriminator 412 classifies mental disorder embedding 420 and mean and variance embedding 422 as being real or fake using speech embedding 418. If the result from the loss function for auxiliary discriminator 412 indicates that auxiliary discriminator 412 performs poorly at classifying mental disorder embedding 420 and mean and variance embedding 422 as real or fake, auxiliary discriminator 412 updates classification algorithm to improve its ability to correctly distinguish real data from fake data through backpropagation. In this example, auxiliary discriminator 412 is evaluated again and updated again until auxiliary discriminator 412 can correctly classify mental disorder embedding 420 and mean and variance embedding 422 as being real or fake.

On the other hand, if the result from the loss function for auxiliary discriminator 412 indicates that auxiliary discriminator 412 performs well at classifying mental disorder embedding 420 and mean and variance embedding 422 as real or fake, auxiliary discriminator 412 generates feedback that can be used to train mental disorder attribute generator 402 and mean and variance generator 404 to generate more realistic embeddings.

In this illustrative example, discriminator 414 classifies synthetic electroencephalograph signals 410 to determine the quality for synthetic electroencephalograph signals 410. As depicted, the quality of synthetic electroencephalograph signals 410 refers the how realistic the signals are. In a similar fashion, synthetic electroencephalograph signals 410 has good quality if synthetic electroencephalograph signals 410 cannot be distinguished from real data by a discriminator in discriminator network 430.

As depicted, discriminator 414 receives real electroencephalograph signals and synthetic electroencephalograph signals 410 as inputs and determines whether real electroencephalograph signals and synthetic electroencephalograph signals 410 are real or fake.

In a similar fashion, if the result from the loss function for discriminator 414 indicates that discriminator 414 performs poorly at determining whether real electroencephalograph signals and synthetic electroencephalograph signals 410 are real or fake, discriminator 414 updates classification algorithm to improve its ability to correctly distinguish real data from fake data through backpropagation. With this result, discriminator 414 is evaluated again and updated again until discriminator 414 can correctly classify synthetic electroencephalograph signals 410 as being real or fake.

On the other hand, if the result from the loss function for discriminator 414 indicates discriminator 414 performs well at classifying real electroencephalograph signals and synthetic electroencephalograph signals 410 as real or fake, discriminator 414 generates feedback that can be used to train feature generator 406 to generate more realistic electroencephalograph signals.

Auxiliary discriminator 412 and discriminator 414 are combined to generate combined discriminator 416. In this illustrative example, combined discriminator 416 is designed to determine the quality of all synthetic data including mental disorder embedding 420, mean and variance embedding 422, and synthetic electroencephalograph signals 410.

In this illustrative example, loss function for combined discriminator 416 is a combination of loss functions from auxiliary discriminator 412 and discriminator 414. Loss function for combined discriminator 416 takes sum of the outputs from loss function for auxiliary discriminator 412 and outputs from loss function for discriminator 414 to provide a final score as a float number. Outputs from loss function for auxiliary discriminator 412 and outputs from loss function for discriminator 414 can be assigned different weights when generating the final score for combined discriminator 416. The weights can be used to adjust the relative importance of each discriminator in combined discriminator 416. In other words, the discriminator assigned with higher weight has more influence on the training of generative adversarial network. For example, the loss function for combined discriminator 416 can be expressed as:

$$\text{Combined Loss}=a*\text{LOSS}_A+1*\text{LOSS}_D \quad (1)$$

where $\text{Loss}_A$ is the output from auxiliary discriminator 412, $\text{Loss}_D$ is the output from discriminator 414, a is the weight for output from auxiliary discriminator 412, and 1 is the weight for output from discriminator 414.

If the result from the loss function for combined discriminator 416 indicates that combined discriminator 416 performs poorly at classifying mental disorder embedding 420, mean and variance embedding 422, and synthetic electroencephalograph signals 410 as real or fake, combined discriminator 416 updates classification algorithm to improve its ability to correctly distinguish real data from fake data through backpropagation. In this example, combined discriminator 416 is evaluated and updated again until combined discriminator 416 can correctly classify mental disorder embedding 420, mean and variance embedding 422, and synthetic electroencephalograph signals 410 as being real or fake.

On the other hand, if the result from the loss function for combined discriminator 416 indicates combined discriminator 416 performs well at classifying mental disorder embedding 420, mean and variance embedding 422, and synthetic electroencephalograph signals 410 as real or fake, combined discriminator 416 generates feedback that can be used to train mental disorder attribute generator 402, mean and variance generator 404, and feature generator 406 to generate more realistic embeddings and electroencephalograph signals. This updating of these generators can be performed using backpropagation of the neural networks in the generators.

The illustration of training generative adversarial network in FIG. 4 is not meant to imply physical or architectural limitations to the manner in which an illustrative embodiment can be implemented. Other components in addition to or in place of the ones illustrated may be used. Some components may be unnecessary. For example, other types of neural networks designed for processing times series data can be implemented in speech encoder 400 and feature generator 406.

Figure 5:
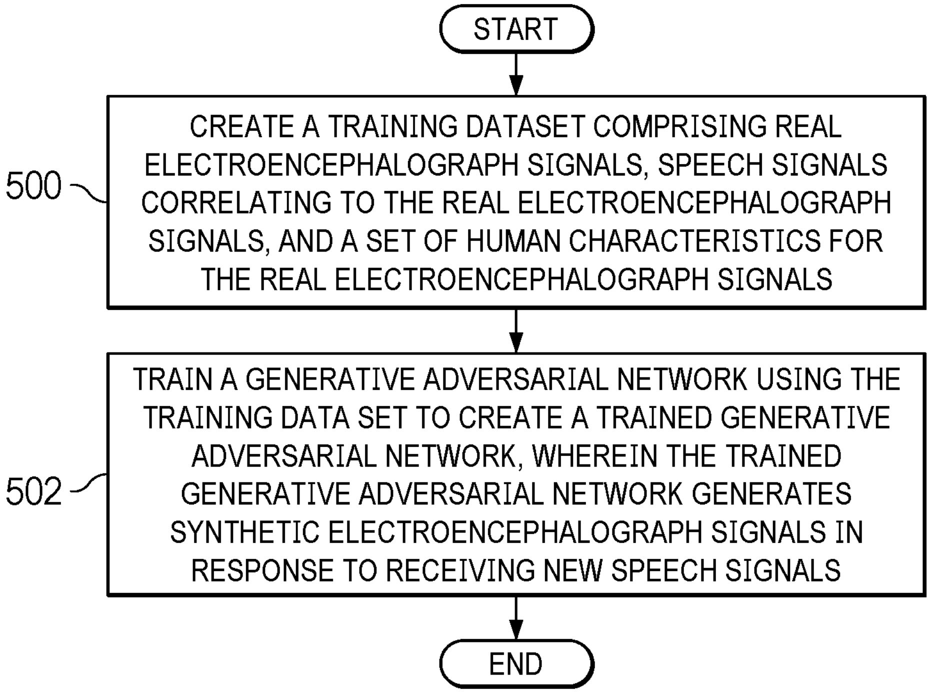
FIG. 5 is a flowchart of a process for synthesizing electroencephalograph signals is accordance with an illustrative embodiment.

Turning next to FIG. 5, a flowchart of a process for synthesizing electroencephalograph signals is depicted in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in speech converter 214 in computer system 212 in FIG. 2. The process in this example synthesizes electroencephalograph signals as part of the training process.

The process begins by creating a training dataset comprising real electroencephalograph signals, speech signals correlating to the real electroencephalograph signals, and a set of human characteristics for the real electroencephalograph signals (step 500). The process trains a generative adversarial network using the training data set to create a trained generative adversarial network, wherein the trained generative adversarial network generates synthetic electroencephalograph signals in response to receiving new speech signals (step 502).

In step 502, the generative adversarial network comprises a generator and a discriminator. The generator generates synthetic electroencephalograph signals in response to receiving the training data in the training dataset. The discriminator attempts to determine whether the synthetic electroencephalograph signals generated by the generator are real or fake.

Figure 6:
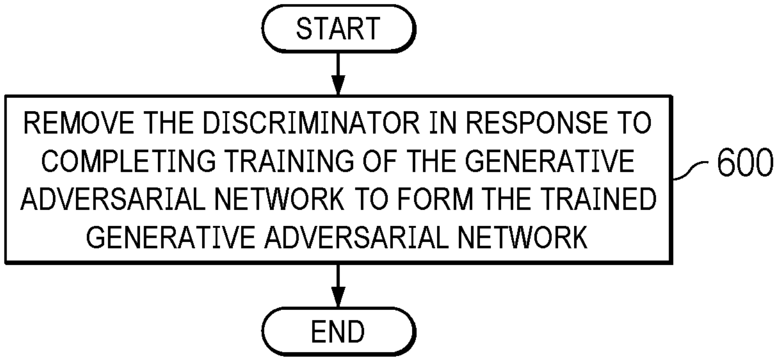
FIG. 6 is a flowchart of a process for synthesizing electroencephalograph signals in accordance with an illustrative embodiment.

In FIG. 6, a flowchart of a process for synthesizing electroencephalograph signals is depicted in accordance with an illustrative embodiment. This flowchart depicts an additional step that can be performed with the steps in FIG. 5.

The process removes the discriminator in response to completing training of the generative adversarial network to form the trained generative adversarial network (step 600). The process terminates thereafter.

As result, the trained generative adversarial network can receive new speech signals and a selection of human characteristics for use in determining synthetic electroencephalograph signals. For example, the selection of the human characteristics is a number of human characteristics from the set of human characteristics used to train the generative adversarial network.

Figure 7:
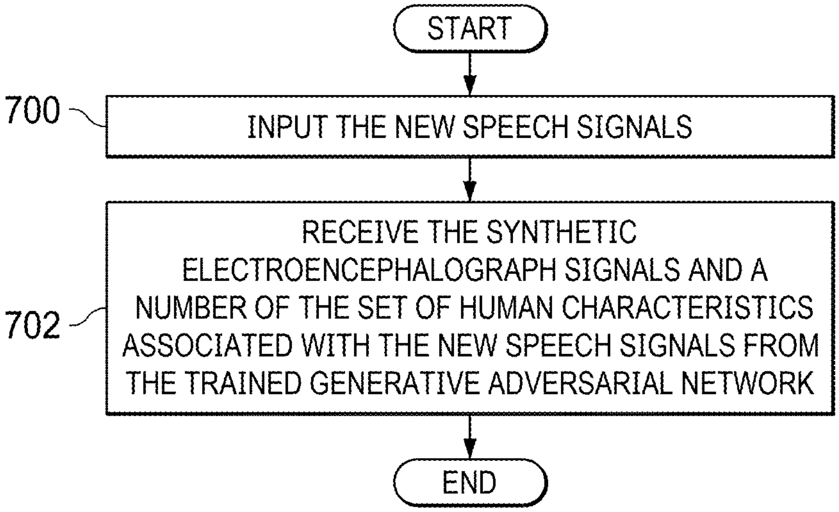
FIG. 7 is a flowchart of a process for synthesizing electroencephalograph signals in accordance with an illustrative embodiment.

With reference now to FIG. 7, a flowchart of a process for synthesizing electroencephalograph signals is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in speech converter 214 in computer system 212 in FIG. 2. This process illustrates a use of a trained generative adversarial network. The trained generative adversarial network does not use the discriminator. This discriminator can be removed after training is completed to form the trained generative adversarial network.

The process begins by inputting the new speech signals (step 700). The process receives the synthetic electroencephalograph signals and a number of the set of human characteristics associated with the new speech signals from the trained generative adversarial network (step 702). The process terminates thereafter.

Figure 8:
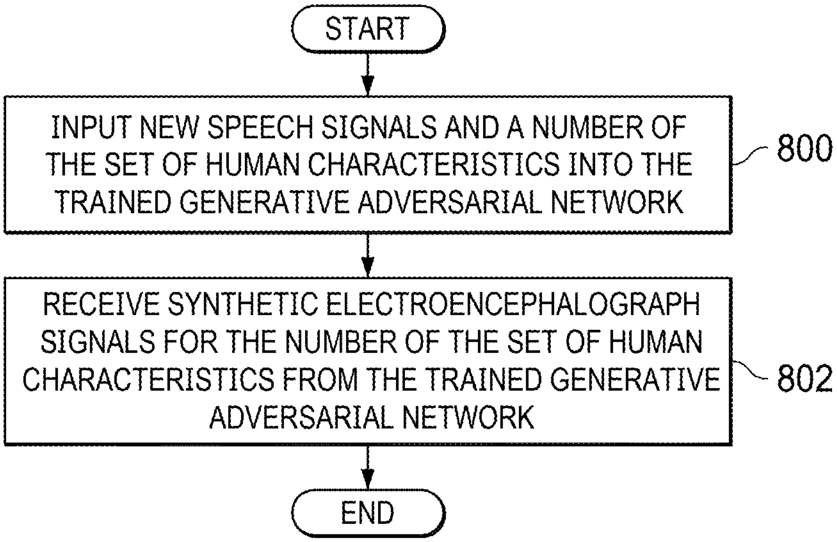
FIG. 8 is another flowchart of a process for synthesizing electroencephalograph signals in accordance with an illustrative embodiment.

With reference now to FIG. 8, another flowchart of a process for synthesizing electroencephalograph signals is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in speech converter 214 in computer system 212 in FIG. 2. This process illustrates a use of a trained generative adversarial network. The trained generative adversarial network does not use the discriminator. This discriminator can be removed after training is completed to form the trained generative adversarial network.

The process begins by inputting new speech signals and a number of the set of human characteristics into the trained generative adversarial network (step 800). The process receives synthetic electroencephalograph signals for the number of the set of human characteristics from the trained generative adversarial network (step 802). The process terminates thereafter.

Figure 9:
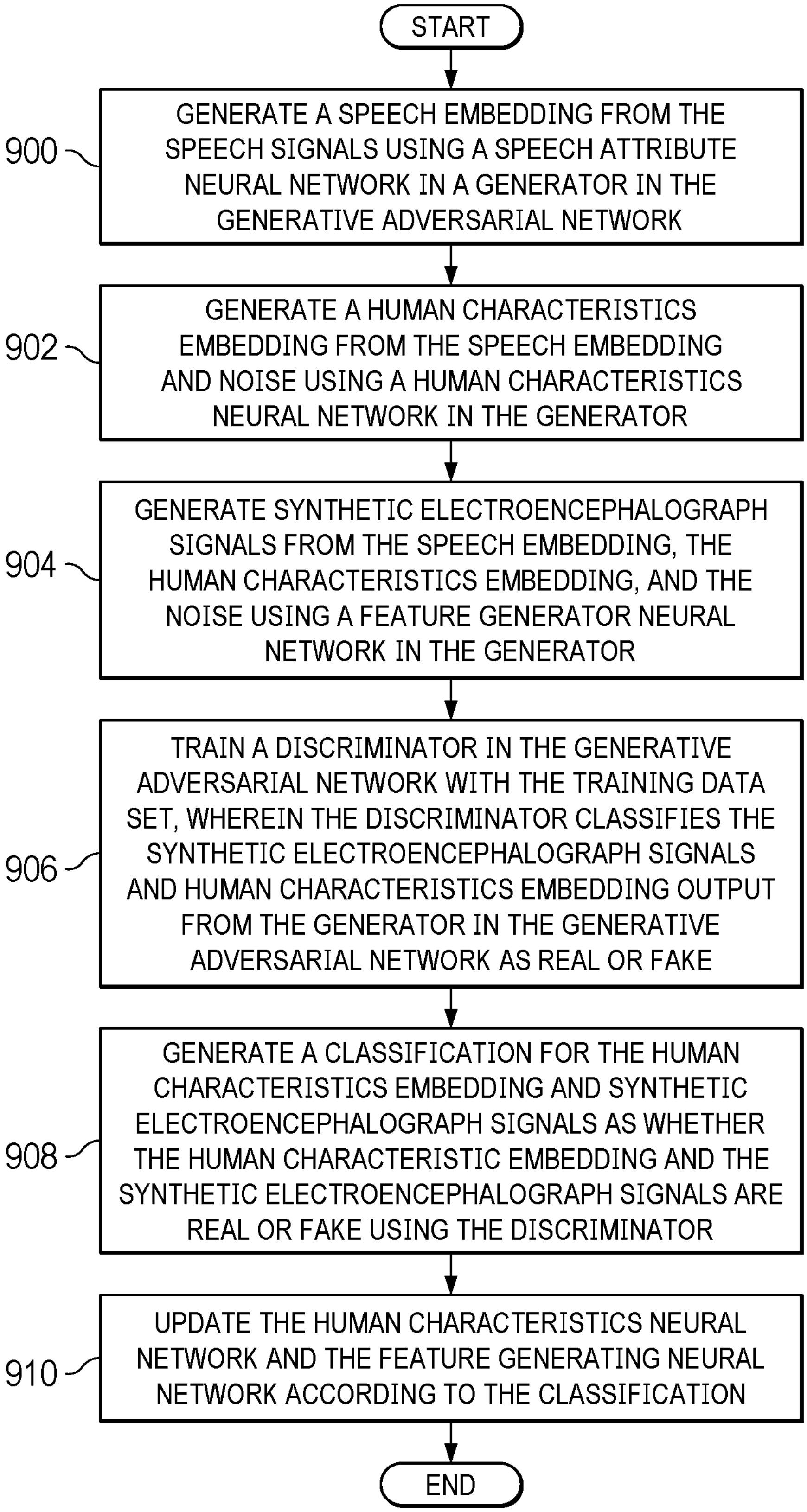
FIG. 9 is a flowchart of a process for training a generative adversarial network in accordance with an illustrative embodiment.

With reference next to FIG. 9, a flowchart of a process for training a generative adversarial network is depicted in accordance with an illustrative embodiment. The steps in this flowchart are examples of an implementation for step 502 in FIG. 5. In this example, the generative adversarial network comprises a generator and a discriminator. The generator includes a speech attribute neural network, a human characteristics neural network, and a feature generator neural network.

In this example, noise is introduced into the generator. The noise is used as a way to introduce randomness and variability into the output generated by the different neural networks. In other words, the noise helps model inherent uncertainty and variability that can occur when processing speech signals. Noise can be used through the entire training process or removed after early stages. Noise can be removed as the generator becomes more accurate in generating synthetic electroencephalograph signals that are more realistic.

The process begins by generating a speech embedding from the speech signals using a speech attribute neural network in a generator in the generative adversarial network (step 900). The process generates a human characteristics embedding from the speech embedding and noise using a human characteristics neural network in the generator (step 902). The process generates synthetic electroencephalograph signals from the speech embedding, the human characteristics embedding, and the noise using a feature generator neural network in the generator (step 904).

The process trains a discriminator in the generative adversarial network with the training data set, wherein the discriminator classifies the synthetic electroencephalograph signals and human characteristics embedding output from the generator in the generative adversarial network as real or fake (step 906). The process generates a classification for the human characteristics embedding and synthetic electroencephalograph signals as whether the human characteristic embedding and the synthetic electroencephalograph signals are real or fake using the discriminator (step 908).

The process updates the human characteristics neural network and the feature generating neural network according to the classification (step 910). The process terminates thereafter. In step 910, this updating is part of the training process to increase the accuracy of the generator portion of the generative adversarial network. This updating can be performed using currently available backpropagation techniques for neural networks.

Figure 10:
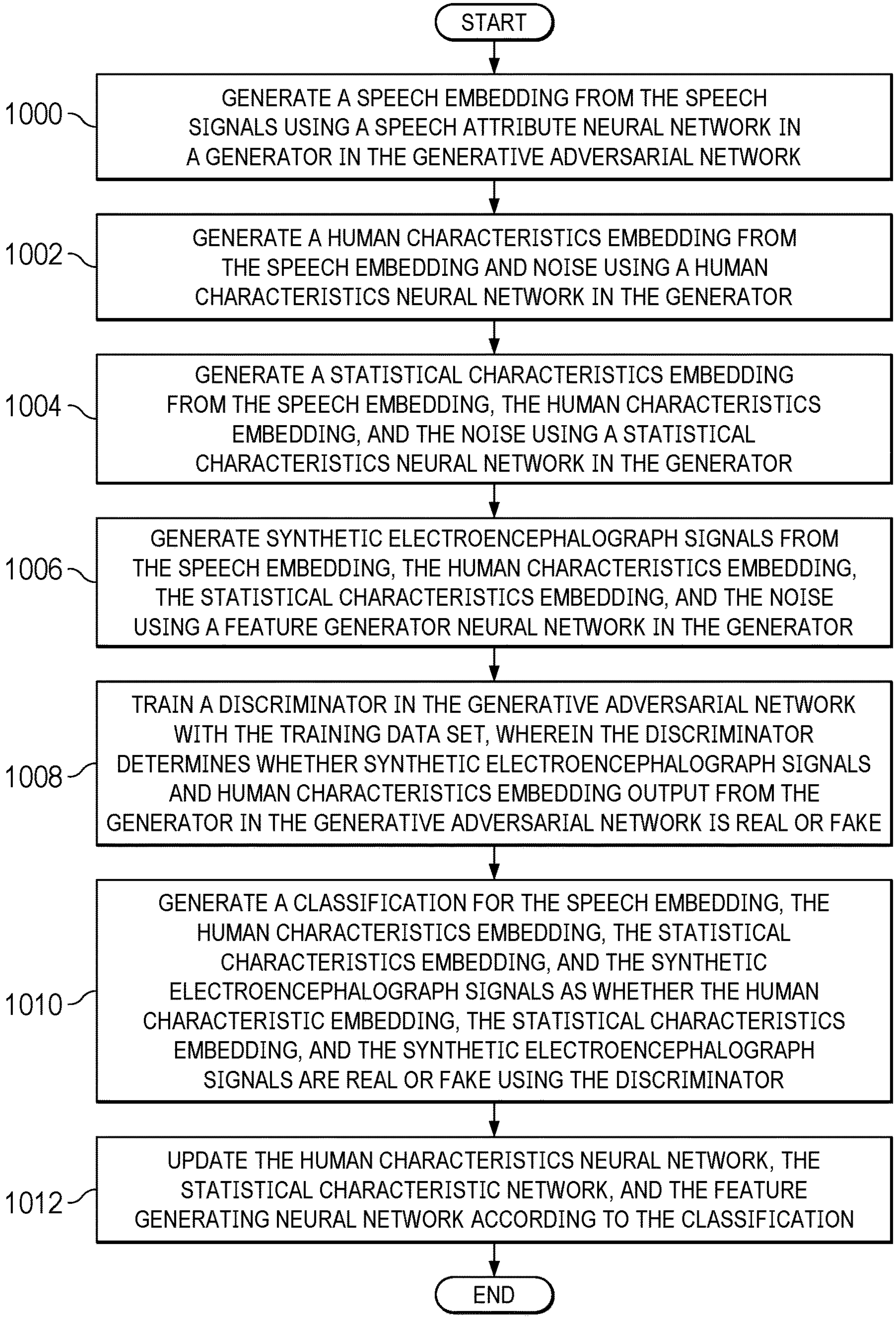
FIG. 10 is a flowchart of a process for training a generative adversarial network in accordance with an illustrative embodiment.

Turning to FIG. 10, a flowchart of a process for training a generative adversarial network is depicted in accordance with an illustrative embodiment. The steps in this flowchart are examples of an implementation for step 502 in FIG. 5. In this example, the generative adversarial network comprises a generator and a discriminator. The generator includes a speech attribute neural network, a human characteristics neural network, a statistical characteristics neural network, and a feature generator neural network.

The process generates a speech embedding from the speech signals using a speech attribute neural network in a generator in the generative adversarial network (step 1000). The process generates a human characteristics embedding from the speech embedding and noise using a human characteristics neural network in the generator (step 1002). The process generates a statistical characteristics embedding from the speech embedding, the human characteristics embedding, and the noise using a statistical characteristics neural network in the generator (step 1004). The process generates synthetic electroencephalograph signals from the speech embedding, the human characteristics embedding, the statistical characteristics embedding, and the noise using a feature generator neural network in the generator (step 1006).

The process trains a discriminator in the generative adversarial network with the training data set, wherein the discriminator determines whether synthetic electroencephalograph signals and human characteristics embedding output from the generator in the generative adversarial network is real or fake (step 1008). The process generates a classification for the speech embedding, the human characteristics embedding, the statistical characteristics embedding, and the synthetic electroencephalograph signals as whether the human characteristic embedding, the statistical characteristics embedding, and the synthetic electroencephalograph signals are real or fake using the discriminator (step 1010).

The process updates the human characteristics neural network, the statistical characteristic network, and the feature generating neural network according to the classification (step 1012). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
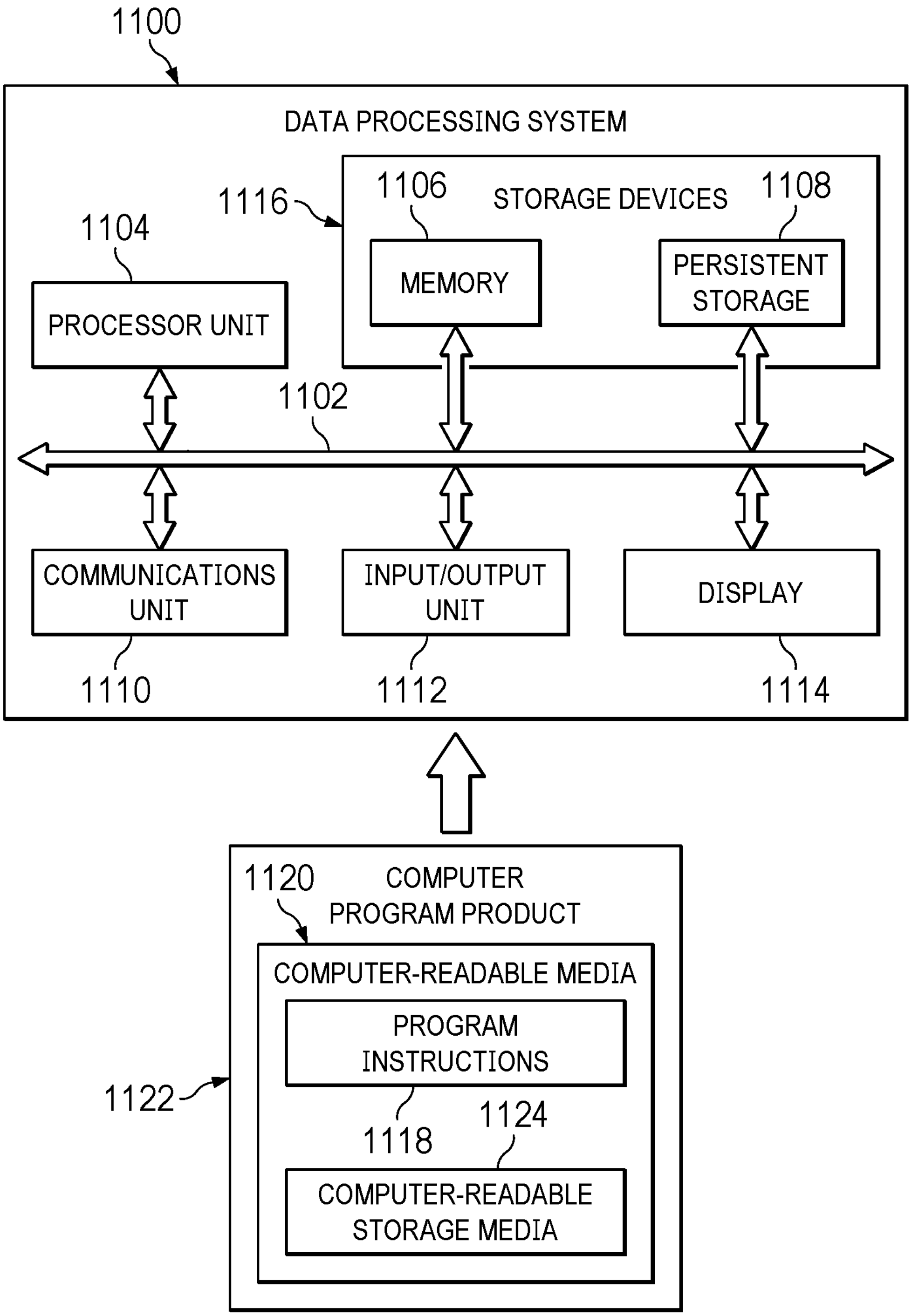
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement computers and computing devices in computing environment 100 in FIG. 1. Data processing system 1100 can also be used to implement computer system 212 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1116 may also be referred to as computer readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program instructions, computer usable program instructions, or computer readable program instructions that can be read and executed by a processor in processor unit 1104. The program instructions in the different embodiments can be embodied on different physical or computer readable storage media, such as memory 1106 or persistent storage 1108.

Program instructions 1118 are located in a functional form on computer-readable media 1120 that is selectively removable and can be loaded onto or transferred to data processing system 1100 for execution by processor unit 1104. Program instructions 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program instructions 1118 rather than a medium that propagates or transmits program instructions 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1118 can be transferred to data processing system 1100 using a computer readable signal media. The computer readable signal media are signals and can be, for example, a propagated data signal containing program instructions 1118. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program instructions 1118 can be located in computer-readable media 1120 in the form of a single storage device or system. In another example, program instructions 1118 can be located in computer-readable media 1120 that is distributed in multiple data processing systems. In other words, some instructions in program instructions 1118 can be located in one data processing system while other instructions in program instructions 1118 can be located in one data processing system. For example, a portion of program instructions 1118 can be located in computer-computer-readable media 1120 in a server computer while another portion of program instructions 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program instructions 1118.

Thus, illustrative embodiments provide a computer implemented method, computer system, and computer program product for synthesizing electroencephalograph signals. In one illustrative example, a computer implemented method synthesizes electroencephalograph signals. A number of processor units creates a training dataset comprising real electroencephalograph signals, speech signals correlating to the real electroencephalograph signals, and a set of human characteristics for the real electroencephalograph signals. The number of processor units trains a generative adversarial network using the training dataset to create a trained generative adversarial network. The trained generative adversarial network generates synthetic electroencephalograph signals in response to receiving new speech signals.

With the generative adversarial network, synthetic electroencephalograph signals can be generated that can pass for real electroencephalograph signals for persons of selected human characteristics. As result, electroencephalograph signals can be generated for research purposes and for diagnosing conditions from using speech signals.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for synthesizing electroencephalograph signals, the computer implemented method comprising:

creating, by a number of processor units, a training dataset comprising real electroencephalograph signals, speech signals correlating to the real electroencephalograph signals, and a set of human characteristics for the real electroencephalograph signals; and training, by the number of processor units, a generative adversarial network using the training dataset to create a trained generative adversarial network, wherein the trained generative adversarial network generates synthetic electroencephalograph signals in response to receiving new speech signals.

2. The computer implemented method of claim 1 further comprising:

inputting, by the number of processor units, the new speech signals into the trained generative adversarial network; and receiving, by the number of processor units, the synthetic electroencephalograph signals and a number of the set of human characteristics associated with the new speech signals from the trained generative adversarial network.

3. The computer implemented method of claim 1 further comprising:

inputting, by the number of processor units, the new speech signals and a number of the set of human characteristics into the trained generative adversarial network; and receiving, by the number of processor units, the synthetic electroencephalograph signals from the trained generative adversarial network.

4. The computer implemented method of claim 1, wherein the training dataset further comprises a set of statistical characteristics determined from the real electroencephalograph signals.

5. The computer implemented method of claim 4, wherein the set of statistical characteristics is selected from at least one of a mean, a variance, a skewness, a non-excess or historical kurtosis, a hyperskewness, a hypertailedness, a high-order or mixed moments, a cumulant, or a frequency distribution of the real electroencephalograph signals.

6. The computer implemented method of claim 4, wherein training, by the number of processor units, the generative adversarial network with the training dataset comprises:

generating, by the number of processor units, a speech embedding from the speech signals using a speech attribute neural network in a generator in the generative adversarial network;

generating, by the number of processor units, a human characteristics embedding from the speech embedding and noise using a human characteristics neural network in the generator;

generating, by the number of processor units, a statistical characteristics embedding from the speech embedding, the human characteristics embedding, and the noise using a statistical characteristics neural network in the generator;

generating, by the number of processor units, the synthetic electroencephalograph signals from the speech embedding, the human characteristics embedding, the statistical characteristics embedding, and the noise using a feature generator neural network in the generator;

training, by the number of processor units, a discriminator in the generative adversarial network with the training dataset, wherein the discriminator determines whether the synthetic electroencephalograph signals and the human characteristics embedding output from the generator in the generative adversarial network is real or fake;

generating, by the number of processor units, a classification for the speech embedding, the human characteristics embedding, the statistical characteristics embedding, and the synthetic electroencephalograph signals as whether the human characteristics embedding, the statistical characteristics embedding, and the synthetic electroencephalograph signals are real or fake using the discriminator; and updating, by the number of processor units, the human characteristics neural network, the statistical characteristics neural network, and the feature generator neural network according to the classification.

7. The method of claim 6 further comprising:

removing, by the number of processor units, the discriminator in response to completing training of the generative adversarial network to form the trained generative adversarial network.

8. The computer implemented method of claim 1, wherein the set of human characteristics is selected from at least one of an age, a gender, an ethnicity, an income level, an education level, an occupation, a marital status, a geographic location, a height, a hair color, an eye color, a body mass index, a cardiovascular attribute, health attribute, a mental health attribute, a mental disorder attribute, a neurodegenerative condition, a speech disorder, a skull property, or a brain anatomy attribute.

9. The computer implemented method of claim 1, wherein training, by the number of processor units, the generative adversarial network using the training dataset comprises:

generating, by the number of processor units, a speech embedding from the speech signals using a speech attribute neural network in a generator in the generative adversarial network;

generating, by the number of processor units, a human characteristics embedding from the speech embedding and noise using a human characteristics neural network in the generator;

generating, by the number of processor units, the synthetic electroencephalograph signals from the speech embedding, the human characteristics embedding, and the noise using a feature generator neural network in the generator;

training, by the number of processor units, a discriminator in the generative adversarial network with the training dataset, wherein the discriminator classifies the synthetic electroencephalograph signals and the human characteristics embedding output from the generator in the generative adversarial network as real or fake;

generating, by the number of processor units, a classification for the human characteristics embedding and the synthetic electroencephalograph signals as whether the human characteristics embedding and the synthetic electroencephalograph signals are real or fake using the discriminator; and updating the human characteristics neural network and the feature generator neural network according to the classification.

10. The computer implemented method of claim 1, wherein the generative adversarial network comprises:

a generator comprising:

a speech attribute neural network that receives the speech signals and outputs a speech embedding; and a human characteristics neural network that receives the speech embedding and noise and outputs a human characteristics embedding;

a feature generator neural network system that receives the speech embedding, the human characteristics embedding, and the noise and outputs the synthetic electroencephalograph signals; and a discriminator trained to classify the synthetic electroencephalograph signals received from the generator as real or fake.

11. The computer implemented method of claim 1, wherein the generative adversarial network comprises:

a generator comprising:

a speech attribute neural network that receives the speech signals and outputs a speech embedding; and a human characteristics neural network that receives the speech embedding and noise and outputs a human characteristics embedding;

a statistical characteristics neural network that receives the speech embedding, the human characteristics embedding, and the noise and outputs a statistical characteristics embedding;

a feature generator neural network system that receives the speech embedding, the human characteristics embedding, the statistical characteristics embedding, and the noise and outputs the synthetic electroencephalograph signals; and a discriminator trained to classify the synthetic electroencephalograph signals received from the generator as real or fake.

12. A computer system comprising:

a number of processor units, wherein the number of processor units executes program instructions to:

create a training dataset comprising real electroencephalograph signals, speech signals correlating to the real electroencephalograph signals, and a set of human characteristics for the real electroencephalograph signals; and train a generative adversarial network using the training dataset to create a trained generative adversarial network, wherein the trained generative adversarial network generates synthetic electroencephalograph signals in response to receiving new speech signals.

13. The computer system of claim 12, wherein the number of processor units further executes program instructions to:

input the new speech signals into the trained generative adversarial network; and receive the synthetic electroencephalograph signals and a number of the set of human characteristics associated with the new speech signals from the trained generative adversarial network.

14. The computer system of claim 12, wherein the number of processor units further executes program instructions to:

input the new speech signals and a number of the set of human characteristics into the trained generative adversarial network; and receive the synthetic electroencephalograph signals from the trained generative adversarial network.

15. The computer system of claim 14, wherein as part of training the generative adversarial network with the training dataset, the number of processor units further executes program instructions to:

generate a speech embedding from the speech signals using a speech attribute neural network in a generator in the generative adversarial network;

generate a human characteristics embedding from the speech embedding and noise using a human characteristics neural network in the generator;

generate a statistical characteristics embedding from the speech embedding, the human characteristics embedding, and the noise using a statistical characteristics neural network in the generator;

generate the synthetic electroencephalograph signals from the speech embedding, the human characteristics embedding, the statistical characteristics embedding, and the noise using a feature generator neural network in the generator;

train a discriminator in the generative adversarial network with the training dataset, wherein the discriminator determines whether the synthetic electroencephalograph signals and the human characteristics embedding output from the generator in the generative adversarial network is real or fake;

generate a classification for the speech embedding, the human characteristics embedding, the statistical characteristics embedding, and the synthetic electroencephalograph signals as whether the human characteristics embedding, the statistical characteristics embedding, and the synthetic electroencephalograph signals are real or fake using the discriminator; and update the human characteristics neural network, the statistical characteristics neural network, and the feature generator neural network according to the classification.

16. The computer system of claim 12, wherein the training dataset further comprises a set of statistical characteristics determined from the real electroencephalograph signals.

17. The computer system of claim 16, wherein the set of statistical characteristics is selected from at least one of a mean, a variance, a skewness, a non-excess or historical kurtosis, a hyperskewness, a hypertailedness, a high-order or mixed moments, a cumulant, or a frequency distribution of the real electroencephalograph signals.

18. The computer system of claim 12, wherein the set of human characteristics is selected from at least one of an age, a gender, an ethnicity, an income level, an education level, an occupation, a marital status, a geographic location, a height, a hair color, an eye color, a body mass index, a cardiovascular attribute, health attribute, a mental health attribute, a mental disorder attribute, a neurodegenerative condition, a speech disorder, a skull property, or a brain anatomy attribute.

19. The computer system of claim 12, wherein as part of training the generative adversarial network using the training dataset, the number of processor units further executes program instructions to:

generate a speech embedding from the speech signals using a speech attribute neural network in a generator in the generative adversarial network;

generate a human characteristics embedding from the speech embedding and noise using a human characteristics neural network in the generator;

generate the synthetic electroencephalograph signals from the speech embedding, the human characteristics embedding, and the noise using a feature generator neural network in the generator;

train a discriminator in the generative adversarial network with the training dataset, wherein the discriminator classifies the synthetic electroencephalograph signals and the human characteristics embedding output from the generator in the generative adversarial network as real or fake;

generate a classification for the human characteristics embedding and the synthetic electroencephalograph signals as whether the human characteristics embedding and the synthetic electroencephalograph signals are real or fake using the discriminator; and update the human characteristics neural network and the feature generator neural network according to the classification.

20. A computer program product for synthesizing electroencephalograph signals, the computer program product comprising a computer readable storage medium having program instructions embodied therewith, the program instructions executable by a computer system to cause the computer system to:

create a training dataset comprising real electroencephalograph signals, speech signals correlating to the real electroencephalograph signals, and a set of human characteristics for the real electroencephalograph signals; and train a generative adversarial network using the training dataset to create a trained generative adversarial network, wherein the trained generative adversarial network generates synthetic electroencephalograph signals in response to receiving new speech signals.

* * * * *